Aug. 1, 1933.　　　　E. HÉRY　　　1,920,392
PULP BEATING ENGINE
Filed April 25, 1931　　　3 Sheets-Sheet 1
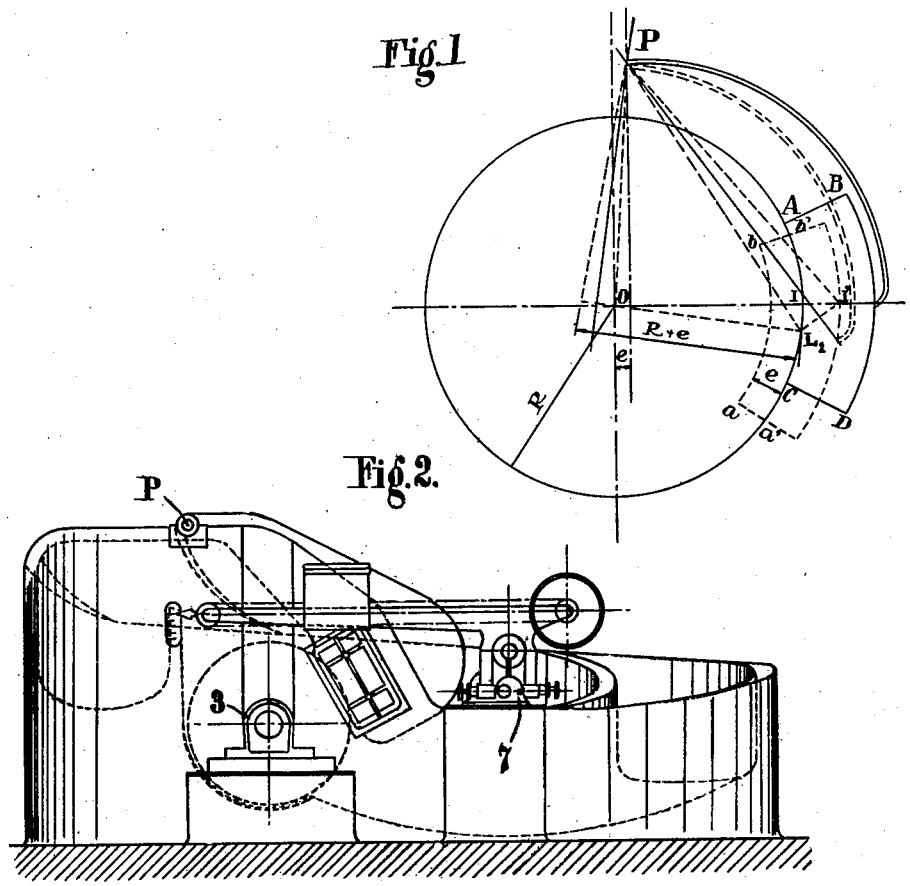
INVENTOR:
Edouard Héry
BY
ATTORNEY Aug. 1, 1933.  E. HÉRY  1,920,392
PULP BEATING ENGINE
Filed April 25, 1931  3 Sheets-Sheet 2
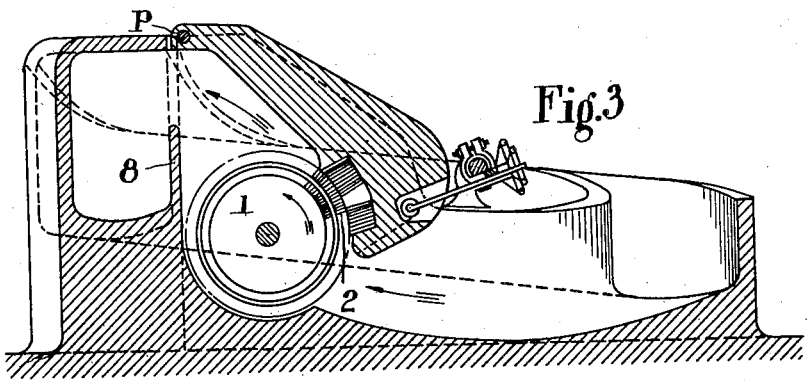
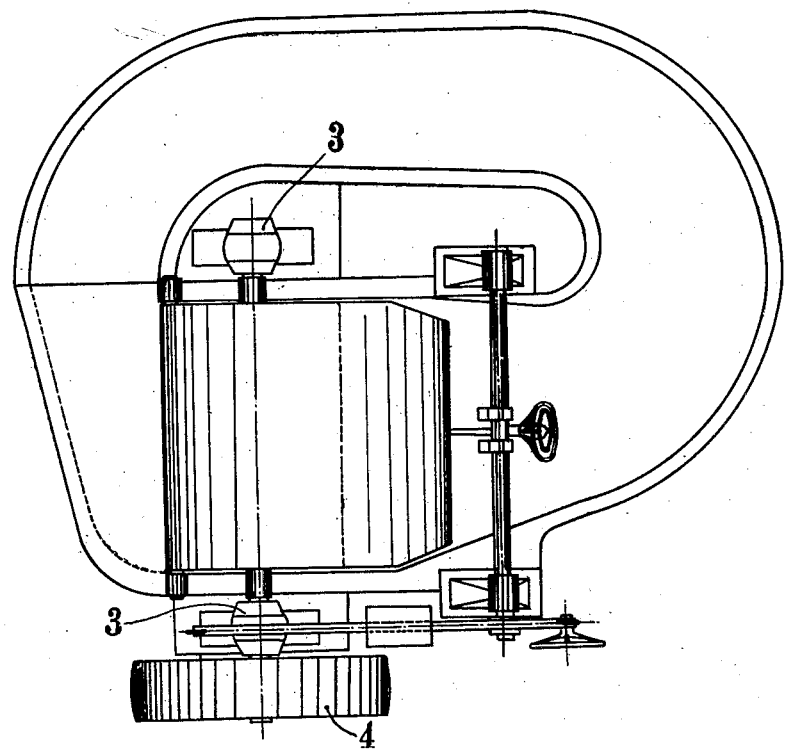
INVENTOR:
Edouard Héry
BY
ATTORNEY

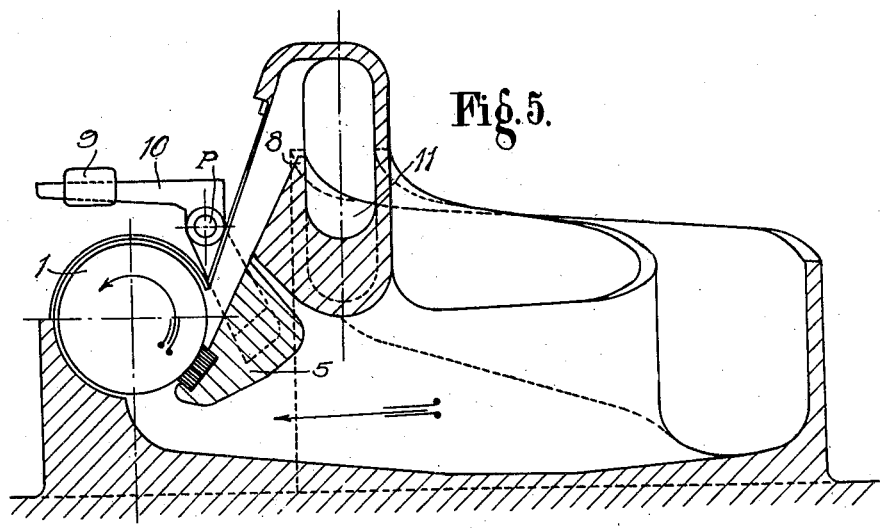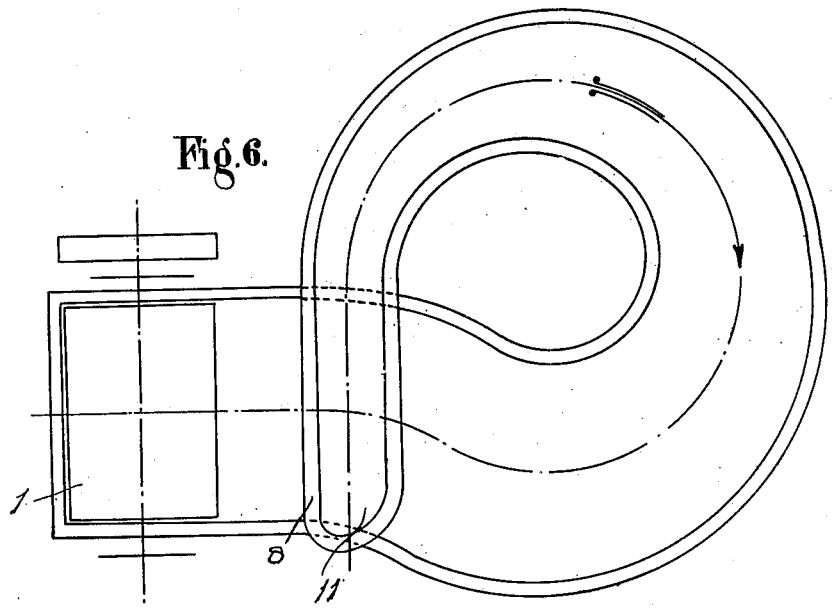

Patented Aug. 1, 1933

1,920,392

UNITED STATES PATENT OFFICE 1,920,392

PULP BEATING ENGINE

Edouard Héry, Paris, France

Application April 25, 1931, Serial No. 532,918, and in Germany May 2, 1930

1 Claim. (Cl. 92—24)

The present invention has for its object to provide improvements in beating engines for paper making having a movable bed plate, of the type known as the "Thorsen beater" forming more particularly the subject matter of the prior patent to Thorsen No. 1,457,865 granted June 5, 1923, the said improvements concerning more particularly, in addition to those effected in the beating engine itself, those relating to the bed plate itself, and more especially, relating to the arrangement of the suspension of the said bed plate.

From this last point of view, the invention applies, in a general manner, to appliances wherein any body whatsoever, movable about an axis of oscillation, bears against a cylinder—or cone—in rotation, either with the view of causing braking or friction, or for any other similar effect.

Any rotation of the movable body about its axis of oscillation, the said rotation resulting from the wear caused by its friction of the cylinder—or cone—may be resolved into:

1. A rotation around the cylinder or cone (tangential sliding).
2. A translation depending upon the position of the axis of oscillation.

The essential feature of the invention, as regards the suspension of the movable system, consists in a particular choice of the positions of the said axis of oscillation, so that the aforesaid movement of translation is effected along a diameter of the cylinder or cone passing through the centre of the arc of friction. In this way, a radial translation is obtained.

A geometrical study of the problem shows that, to a given maximum radial translation—which fixes in magnitude the maximum value of the wear of the friction body—and a maximum tangential sliding, likewise given, there corresponds a definite mathematical position of the axis of suspension such that at the commencement and end of the movement of radial translation of the friction body, that is to say, at the commencement and end of the work of friction, the surfaces of wear of the said body are parallel. The determination of the position of the said axis fixes at the same time the length of the arm of oscillation of the friction body.

By varying the maximum tangential sliding corresponding to a given maximum radial translation (and consequently, to a given maximum wear of the friction body), the geometrical locus is determined of the positions which the axis of oscillation must occupy in order that, at the commencement and end of the movement of translation, that is to say, at the commencement and end of the work of friction, the wearing surfaces of the said body shall be parallel.

To each point on the locus there corresponds a certain arm of oscillation.

This geometrical locus is the perpendicular erected on the radius passing through the centre of the arc of friction—between the centre of the cylinder, or of the cone, and the said arc—and at a distance from the said centre equal to half the wear in question.

If it is desired that the friction surfaces shall remain parallel during the whole of the duration of wear of the friction body—and not merely for positions corresponding to maximum wear and zero wear—it is sufficient to displace the centre of oscillation in proportion to the wear in the vicinity of the point determined on the aforementioned geometrical locus, by the length of the arm of oscillation selected.

The present invention applies more particularly to appliances known in the paper making industry under the name of beating engines, and to similar appliances, wherein a movable bed plate is applied against a cylinder or roll rotating in fixed bearings. The characteristic arrangement of the invention permits as regular a wear as possible of the bed plate and a better working of the pulp.

In order to render the explanations given hereinafter as clear as possible, the accompanying drawings illustrate, merely by way of example, the characteristic arrangements of the invention.

Figure 1 is a diagram to render comprehensible the determination of the geometrical locus of the axis of oscillation P for a friction body ABCD, which is assumed to be displaced in such a way that a point I' on the said body will arrive at $L^1$ for a wear of the friction body equal to $e=II'$.

Figures 2 to 4 are different views of the beating engine improved according to the invention.

Figs. 5 and 6 show respectively in cross section and plan a slightly modified form of the arrangement.

The roll 1, provided with knives 2, is mounted in bearings 3 and is driven by means of a pulley 4 or any other suitable transmission gear, such as direct coupling with the engine, gearwheels, reduction gears, etc., according to the known arrangement of beating engines called "Thorsen beaters" constituting more particularly the subject matter of the prior patent to Thorsen No. 1,457,865 granted June 5, 1923.

Against the surface of the roll, and concentric thereto, is applied in a controllable manner the bed plate 5 provided with knives 6 and turning freely about the axis of rotation P. It is the position of this centre of rotation which characterizes the present invention. The position of the said centre is such that, under the influence of the pressure exerted on the bed plate, when the lower portion of the said bed plate has been worn by an amount $aa'$ considered as a maximum, the upper portion will likewise be worn by an amount $bb'=aa'$, and thus equality of wear will have been obtained for the best.

It will be seen that the work of grinding the pulp rolled between the roll and the bed plate is proportional to the wear of the friction surfaces. Therefore, if a regular wear of the friction surfaces is obtained, regular working of the pulp will be obtained at the same time. On the other hand, the arrangement which has just been described for the beating engine permits complete stability, recognized indispensable for the good refining of pulp, to be given to the unit formed by the bed plate, its support and the means of articulation at P.

Any other system of oscillation of the bed plate support about one of its points, selected arbitrarily outside the arrangement according to the present invention would result in unequal wear of the bed plate and consequently an irregular rolling work of the pulp between the friction surfaces.

Any other means of suspension of the bed plate (levers, parallelograms, slides etc.) enabling it to be displaced parallel to itself would either deprive the appliance of the stability necessary for the good refining of the pulp or would result in mechanical complications.

It will be seen that, during the clamping movement of the bed plate, the latter moves radially while approaching the roll, and likewise rotates about the axis O so as to pass from the position shown in full line in Figure 1 into the position shown in dotted line.

In practice, during the construction of the beating engines, the position of the centre P may be determined once and for all by the constructor, according to the arrangements of the beating engine and the depth of wear admitted for the knives of the bed plate.

However, the invention reserves the possibility of varying the position of the axis P in proportion to the wear, by means of a suitable mechanical device such as horizontally and vertically adjustable slides, inclined planes of predetermined profile, etc., or also by placing the axis P at the end of oscillating levers of a length fixed beforehand, being supported, for example, round the shaft of the roll.

In addition to permitting the ideal centre of rotation to be adopted in proportion to the wear, the possible displacement of the point P affords the following advantages from the point of view of the application of the invention to pulp beating engines having a movable bed plate.

1. It permits the top edge of the bed plate, i. e., the point of origin of the trajectories followed by the pulp, to be brought back to a definite position, irrespective of the wear of the bed plate and roll.

2. It permits the said point of origin of the trajectories to be varied in accordance with the speed of rotation of the roll and the viscosity or density of the pulp.

As regards stability, the invention likewise relates to the use of a bed plate support, the weight and mass of which reduce to a minimum the vibration of the bodies in contact.

To this end, the centre of oscillation of the bed plate is removed as far as possible from the axis of the roll, and the weight of the bed plate support is transferred as much as possible to the lower portion.

Heretofore, in beating engines having movable bed plates, the pressure on the roll has been given not by the weight of the bed plate support alone, but also by an additional pressure tending to cause the bed plate to move forward towards the centre of the roll, which resulted in excessive wear of the friction surfaces.

In the beating engine constructed according to the present invention, the pressure is obtained solely by the weight of the bed plate support, and the path of the latter towards the centre of the roll may be limited by a suitable device, such as the screw device shown at 7 on the drawings. The result of this is that the weight of the bed plate cannot exert itself on the roll, but it can do so on the pulp interposed between the friction surfaces, so that the value of the gap is not dependent upon the pressure but may be regulated independently thereof. A counterbalance device may balance the bed plate support entirely or partly.

The invention also has for its object the arrangement of the "backfall", shown at 8 on the drawings, over which the pulp is to be projected into the return channel. In beating engines having a movable bed plate, such as that forming the subject matter of the Thorsen U. S. Patent 1,457,865 dated June 5, 1923, the inner wall of the backfall approximately fits the curvature of the roll, well above the horizontal plane passing through the axis of the said roll.

In the arrangement according to this invention, on the contrary, the backfall is properly speaking dispensed with and is replaced by a partition 8 which deviates from the roll starting from the horizontal plane passing through the axis of the said roll and rises, either vertically or with a certain inclination relatively to the vertical plane passing through the axis of the roll. In this way, the stagnation of the pulp on the outer wall of the backfall is avoided.

The invention is likewise applied to beating engines wherein, as shown in Figures 5 and 6, the pulp is projected into the return channel over the bed plate support and not over the roll.

A beating engine of the known type illustrated in Figures 5 and 6 comprises a cylinder 1 provided with longitudinal blades adapted to cooperate with similar blades formed on the bed-plate 5 and a back-fall 8 disposed on the same side relatively to the cylinder and above said bed-plate. The pulp projected over the back-fall 8 falls into the screw-shaped return channel 11 for being fed again to the cylinder. The suspension axis for the bed-plate support is located as explained above, the bed plate being urged towards the cylinder by the weight of its support which is adjustable by means of a counter-weight 9 slidably mounted in a known manner on a projection 10 of said bed-plate support.

Whether the pulp is projected over the bed plate support or over the roll, there is always the possibility of classifying it by collecting it at different levels varying with the degree of viscosity of the material to be worked.

It is reserved to make any modifications of detail within the scope of the invention to the arrangements described in the foregoing and illustrated in the accompanying drawings.

More precisely, as regards the characteristic arrangement of the suspension of the bed plate support, it is reserved to apply the said arrangement to the suspension of any element having functions which are identical or even similar, and more particularly to the suspension of the brake shoes for vehicles, such as railway carriages and wagons, tramways, etc., winches and the like.

I claim:

In a pulp beating engine of the class described, comprising a rotatable cylinder and a bed-plate frictionally cooperating with said cylinder, a member for supporting the bed-plate, said member being pivotally mounted on the frame of the beating engine, the pivot center being situated substantially at the intersection of the perpendicular erected on the cylinder radius passing through the center of the friction surface of the bed-plate on the cylinder at a distance from the center of the cylinder in the direction of the bed-plate equal to half the length of the maximum wear of the bed-plate, and of the perpendicular erected on the middle point of the line connecting the extreme positions of the center of the friction surface of the bed-plate.

EDOUARD HÉRY.